United States Patent
Hazeyama et al.

(10) Patent No.: US 8,334,633 B2
(45) Date of Patent: Dec. 18, 2012

(54) DYNAMOELECTRIC MACHINE

(75) Inventors: Moriyuki Hazeyama, Tokyo (JP);
Hiroyuki Akita, Tokyo (JP); Ryuichi Shimomura, Tokyo (JP); Masaya Inoue, Tokyo (JP); Masao Morita, Tokyo (JP); Toshiyuki Yoshizawa, Tokyo (JP); Shinji Nishimura, Tokyo (JP); Kazunori Tanaka, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 262 days.

(21) Appl. No.: 12/920,954

(22) PCT Filed: Apr. 4, 2008

(86) PCT No.: PCT/JP2008/056779
§ 371 (c)(1),
(2), (4) Date: Sep. 3, 2010

(87) PCT Pub. No.: WO2009/122586
PCT Pub. Date: Oct. 8, 2009

(65) Prior Publication Data
US 2011/0012449 A1 Jan. 20, 2011

(51) Int. Cl.
*H02K 1/22* (2006.01)
*H02K 9/22* (2006.01)
(52) U.S. Cl. .................. 310/263; 310/64; 310/156.66
(58) Field of Classification Search .............. 310/64, 310/156.66, 156.71–156.73, 263
See application file for complete search history.

(56) References Cited

U.S. PATENT DOCUMENTS
5,543,676 A 8/1996 York et al.
(Continued)

FOREIGN PATENT DOCUMENTS
JP 10-136623 5/1998
(Continued)

OTHER PUBLICATIONS
U.S. Appl. No. 12/812,844, filed Jul. 14, 2010, Yoshizawa, et al.
(Continued)

*Primary Examiner* — Tran Nguyen
(74) *Attorney, Agent, or Firm* — Oblon, Spivak, McClelland, Maier & Neustadt, L.L.P.

(57) ABSTRACT

The present invention provides a dynamoelectric machine that enables heat that is generated in a permanent magnet to be transmitted to a fan and be radiated from the fan effectively, that suppresses occurrences of damage to the fan that result from centrifugal forces that act on the permanent magnet, and that also enables the fan to be prepared easily and inexpensively.

In a dynamoelectric machine according to the present invention, a magnet holder (30, 35) that is made of a magnetic material is disposed so as to span over a trough portion (26, 27), an interfitting groove (31, 36) that has a groove direction in an axial direction is formed on the magnet holder (30, 35) so as to open radially outward, and so as to lead inward from an axially outer side, and a permanent magnet (32, 37) is held by the magnet holder (30, 35) by being fitted into the interfitting groove (31, 36) and is disposed so as to face an inner circumferential surface near a tip end of claw-shaped magnetic pole portions (24, 20) and have a predetermined clearance. In addition, a metal fan (40A, 40B) is fixed to an end surface of a pole core body (17, 21), a thermally conductive plate (43) is disposed so as to extend from a base portion (41) axially inward, and a leading end portion thereof is press-fitted between a lower surface of the permanent magnet (32, 37) and a bottom surface of the interfitting groove (31, 36).

6 Claims, 7 Drawing Sheets

U.S. PATENT DOCUMENTS

| | | | |
|---|---|---|---|
| 5,973,435 A * | 10/1999 | Irie et al. | 310/263 |
| 6,201,335 B1 * | 3/2001 | Higashino et al. | 310/263 |
| 6,369,485 B1 * | 4/2002 | Oohashi et al. | 310/263 |
| 6,747,384 B2 * | 6/2004 | Militello et al. | 310/156.08 |
| 6,815,864 B2 * | 11/2004 | Tanaka et al. | 310/263 |
| 6,853,112 B2 * | 2/2005 | Nakamura et al. | 310/263 |
| 7,053,508 B2 * | 5/2006 | Kusase et al. | 310/64 |
| 7,560,851 B2 | 7/2009 | Inoue et al. | |
| 7,605,519 B2 | 10/2009 | Morita et al. | |
| 7,784,168 B2 * | 8/2010 | Ooiwa | 29/598 |
| 7,977,847 B2 * | 7/2011 | Koumura et al. | 310/263 |
| 2002/0117935 A1 * | 8/2002 | Kanazawa et al. | 310/263 |
| 2010/0096941 A1 | 4/2010 | Inoue et al. | |
| 2010/0207476 A1 | 8/2010 | Yoshizawa et al. | |
| 2011/0181142 A1 * | 7/2011 | Yoshizawa et al. | 310/156.12 |

FOREIGN PATENT DOCUMENTS

| | | |
|---|---|---|
| JP | 10-271780 | 10/1998 |
| JP | 11-318065 | 11/1999 |
| JP | 2002-199678 | 7/2002 |
| JP | 2002-527015 | 8/2002 |
| JP | 2003-244875 | 8/2003 |
| WO | WO 99/08365 | 2/1999 |

OTHER PUBLICATIONS

U.S. Appl. No. 12/921,319, filed Sep. 7, 2010, Inoue, et al.
U.S. Appl. No. 13/122,611, filed Apr. 5, 2011, Yoshizawa, et al.
International Search Report issued Jul. 8, 2008 in PCT/JP2008/056779.

* cited by examiner

DYNAMOELECTRIC MACHINE

TECHNICAL FIELD

The present invention relates to a dynamoelectric machine such as an automotive alternator, etc., and particularly relates to a permanent magnet heat radiating construction for a permanent magnet that is mounted to a Lundell rotor.

BACKGROUND ART

Automotive alternators that use Lundell rotors have been used in automobiles for decades. Loads from electrical equipment that is mounted due to environmental issues have been increasing rapidly in recent years, and further increases in generated power are being sought from Lundell rotors.

Conventionally, in order to solve such problems, electric machine rotors have been proposed in which resin fans that rotate together with pole pieces have pockets, and permanent magnets are insert-molded into the pockets so as to be held by the fans (see Patent Literature 1, for example).

Patent Literature 1: Patent Publication No. 2002-527015 (Gazette)

DISCLOSURE OF THE INVENTION

Problem to be Solved by the Invention

In conventional electric machine rotors, because the permanent magnets are insert-molded into the pockets and held by the resin fans, heat from the permanent magnet is transferred to the fans by means of the pockets, and is radiated from the fans. However, sufficient heat transfer cannot be expected because thermal conductivity of the resin itself is low. Furthermore, during high-speed rotation, large centrifugal forces act on the pockets into which the permanent magnet have been insert-molded, and there is a risk that the pockets and the fans may be damaged. Thus, in order to hold the permanent magnets stably, it is necessary to increase rigidity of the pockets and the fans by adding reinforcing fibers, etc., to the resin, but moldability deteriorates significantly, reducing mass producibility. In addition, the permanent magnets must be insert-molded during molding of the fans, reducing productivity of the fans.

The present invention aims to solve the above problems and an object of the present invention is to provide a dynamoelectric machine in which a permanent magnet is held in a magnet holder that is disposed so as to span over a trough portion of a yoke portion, and a thermally conductive plate that is disposed so as to extend from a metal fan is placed in close contact with the permanent magnet, so as to enable heat that is generated in the permanent magnet to be transmitted to the fan and be radiated from the fan effectively, to suppress occurrences of damage to the fan that result from centrifugal forces that act on the permanent magnet, and also to enable the fan to be prepared easily and inexpensively.

Means for Solving the Problem

In order to achieve the above object, according to one aspect of the present invention, there is provided a dynamoelectric machine including: a rotor including: a pole core including: a boss portion; a pair of yoke portions that are disposed so as to extend radially outward from two axial end edge portions of the boss portion; and a plurality of claw-shaped magnetic pole portions that are disposed so as to extend in an axial direction alternately from each of the pair of yoke portions, and that are arranged circumferentially so as to intermesh with each other, the pole core being fixed to a shaft that is inserted through a central axial position of the boss portion; a resin bobbin including: a drum portion that is mounted so as to be fitted over the boss portion; and a pair of flange portions that extend radially outward from two axial end portions of the drum portion parallel to inner wall surfaces of the pair of yoke portions; and a field coil that is wound onto the bobbin, and that is housed inside a space that is surrounded by the boss portion, the pair of yoke portions, and the plurality of claw-shaped magnetic pole portions; a stator that is disposed so as to surround an outer circumference of the rotor so as to have a predetermined air gap interposed; and a metal fan including: a base portion that is fixed to at least one axial end surface of the pole core; and a blade that is disposed so as to stand on the base portion. In addition, the dynamoelectric machine includes: a magnet holder that is made of a magnetic material that is held by a yoke portion so as to face an inner circumferential surface near a tip end of the claw-shaped magnetic pole portions, and in which an interfitting groove that has a groove direction in an axial direction is formed so as to open at least radially outward and axially outward, and so as to lead inward from an axially outer side; a permanent magnet that is held by the magnet holder by being fitted into the interfitting groove, that is disposed so as to face an inner circumferential surface near a tip end of the claw-shaped magnetic pole portions so as to have a predetermined clearance, and that is magnetically oriented in a reverse direction to a direction of a magnetic field that the field coil produces; and a metal thermally conductive plate that is disposed so as to extend axially inward from the base portion, and that has a projecting end portion that is placed in close contact with the permanent magnet.

EFFECTS OF THE INVENTION

According to the present invention, because a permanent magnet is held by a magnet holder that is held by a yoke portion, centrifugal forces that act on the permanent magnet do not act on a fan, enabling occurrences of damage to the fan to be suppressed without increasing rigidity of the fan inordinately.

Because a projecting end portion of a metal thermally conductive plate that is disposed so as to extend axially inward from a base portion of the fan is in close contact with the permanent magnet, heat that is generated in the permanent magnet is transferred to the fan by means of the thermally conductive plate and is radiated to a cooling airflow, suppressing temperature increases in the permanent magnet.

Because the fan is made of metal, the fan can be prepared easily and inexpensively by cutting and bending.

BEST MODE FOR CARRYING OUT THE INVENTION

Embodiment 1

Figure 1:
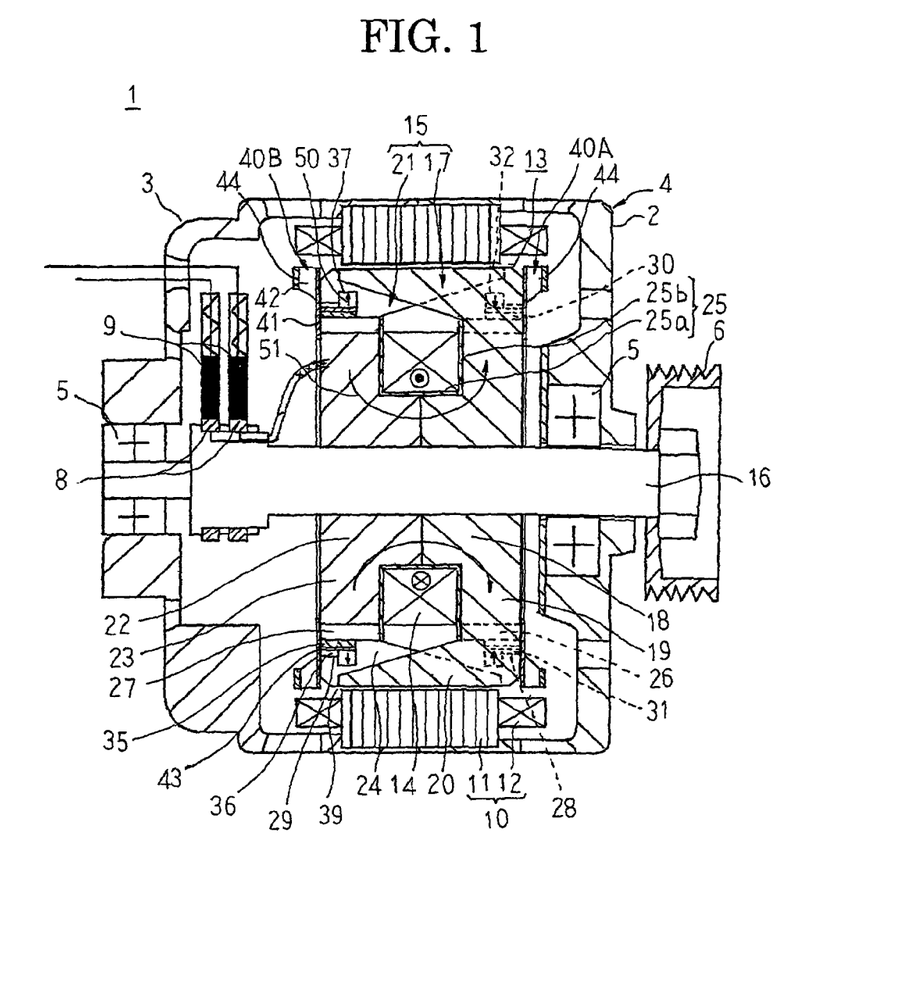
FIG. 1 is a cross section that schematically shows an automotive alternator according to Embodiment 1 of the present invention.
Figure 2:
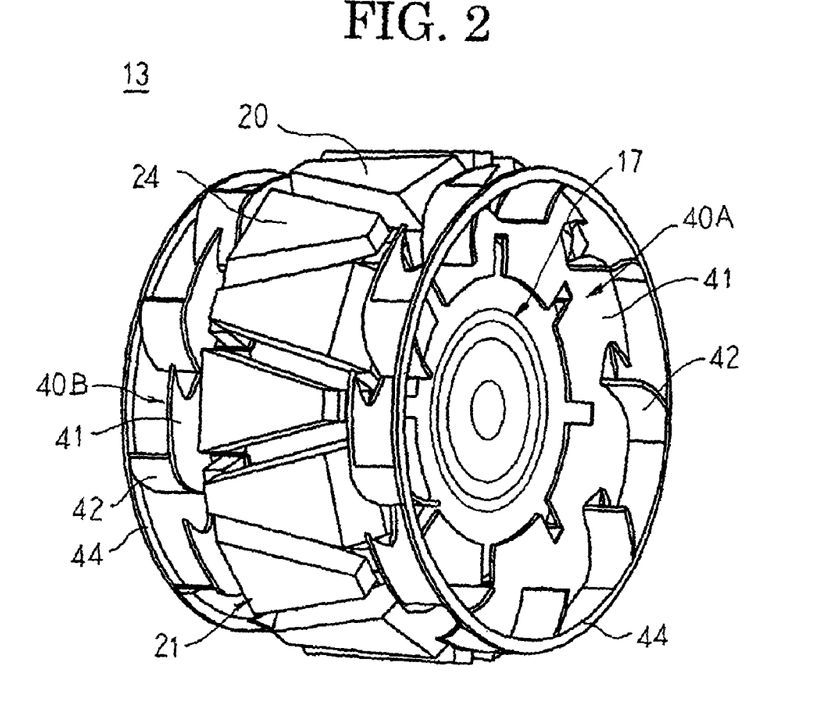
FIG. 2 is a perspective that shows a rotor that can be used in the automotive alternator according to Embodiment 1 of the present invention.
Figure 3:
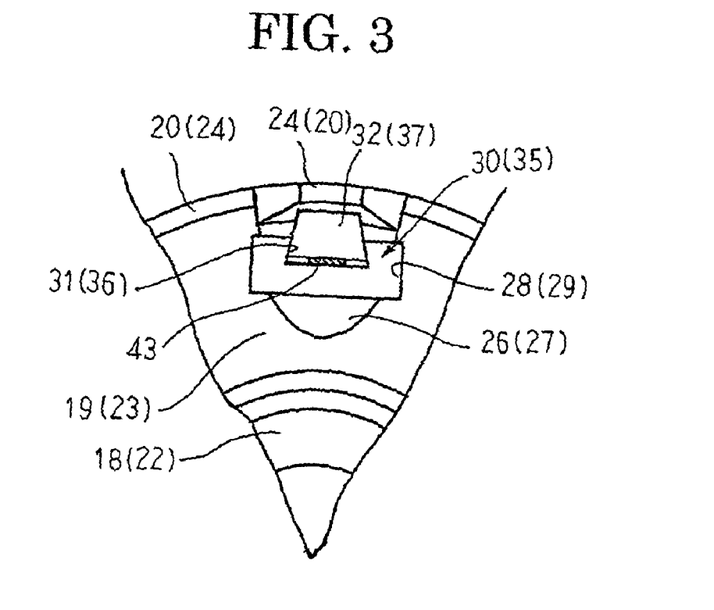
FIG. 3 is a partial end elevation that explains a permanent magnet holding construction in the rotor that can be used in the automotive alternator according to Embodiment 1 of the present invention.
Figure 4:
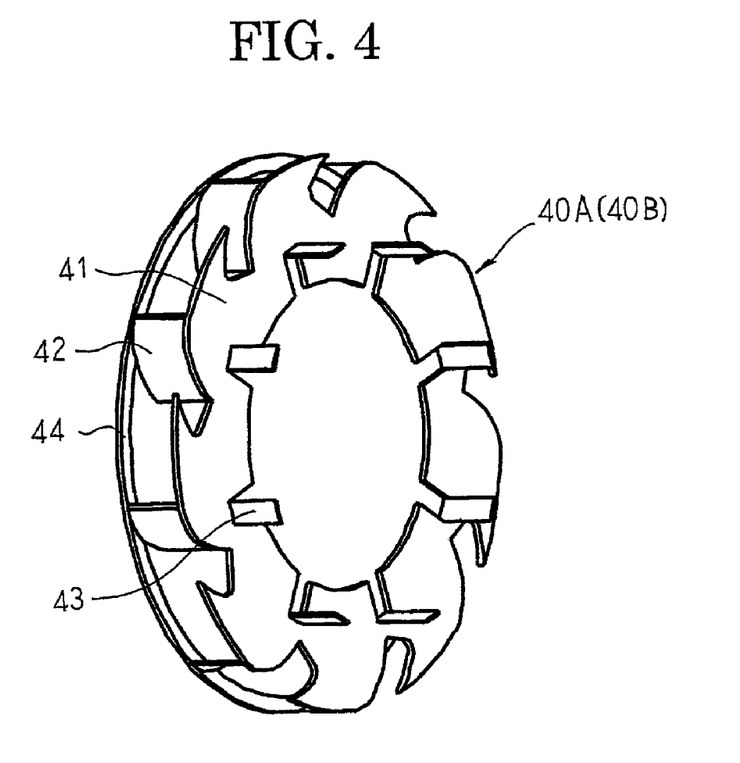
FIG. 4 is a perspective that shows a fan that can be mounted to the rotor that can be used in the automotive alternator according to Embodiment 1 of the present invention.
Figure 5:
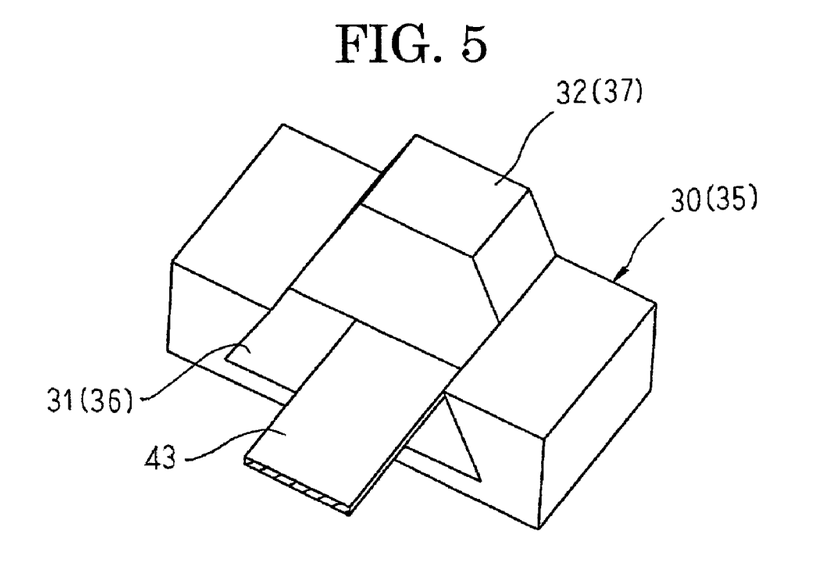
FIG. 5 is a perspective that shows a mounted state of a permanent magnet in the rotor that can be used in the automotive alternator according to Embodiment 1 of the present invention.

FIG. 1 is a cross section that schematically shows an automotive alternator according to Embodiment 1 of the present invention, FIG. 2 is a perspective that shows a rotor that can be used in the automotive alternator according to Embodiment 1 of the present invention, FIG. 3 is a partial end elevation that explains a permanent magnet holding construction in the rotor that can be used in the automotive alternator according to Embodiment 1 of the present invention, FIG. 4 is a perspective that shows a fan that can be mounted to the rotor that can be used in the automotive alternator according to Embodiment 1 of the present invention, and FIG. 5 is a perspective that shows a mounted state of a permanent magnet in the rotor that can be used in the automotive alternator according to Embodiment 1 of the present invention. Moreover, a cooling fan has been omitted from FIG. 3.

In FIGS. 1 through 5, an automotive alternator 1 includes: a case 4 that is constituted by a front bracket 2 and a rear bracket 3 that are each made of aluminum in an approximate cup shape; a rotor 13 that is rotatably disposed inside the case 4 such that a shaft 16 is supported by means of bearings 5 in the case 4; a pulley 6 that is fixed to an end portion of the shaft 16 that projects outward at a front end of the case 4; first and second fans 40A and 40B that are fixed to two axial end surfaces of the rotor 13; a stator 10 that is fixed to the case 4 so as to surround an outer circumference of the rotor 13 so as to have a constant air gap 39 relative to the rotor 13; a pair of slip rings 8 that are fixed to a rear end of the shaft 16, and that supply current to the rotor 13; and a pair of brushes 9 that are disposed inside the case 4 so as to slide on the respective slip rings 8. Moreover, although not shown, a rectifier that rectifies an alternating current that is generated in the stator 10 into direct current, and a voltage regulator that adjusts magnitude of an alternating voltage generated in the stator 10, etc., are disposed inside the case 4.

The stator 10 includes: a cylindrical stator core 11; and a stator coil 12 that is mounted to the stator core 11, and in which an alternating current arises due to changes in magnetic flux from a field coil 14 (described below) that accompany rotation of the rotor 13.

The rotor 13 includes: a field coil 14 that generates magnetic flux on passage of an excitation current; a pole core 15 that is disposed so as to cover the field coil 14 and in which magnetic poles are formed by that magnetic flux; and the shaft 16, which is fitted through a central axial position of the pole core 15.

The pole core 15 is configured so as to be divided into first and second pole core bodies 17 and 21 that are each prepared by a cold forging manufacturing method using a low carbon steel such as S10C, for example.

The first pole core body 17 has: a first boss portion 18 that has an outer circumferential surface that has a cylindrical shape, and in which a shaft insertion aperture is formed so as to pass through a central axial position; a thick ring-shaped first yoke portion 19 that is disposed so as to extend radially outward from a first end edge portion of the first boss portion 18; and first claw-shaped magnetic pole portions 20 that are disposed so as to extend toward a second axial end from outer circumferential portions of the first yoke portion 19. Eight, for example, first claw-shaped magnetic pole portions 20 are formed so as to have a tapered shape in which a radially-outermost surface shape is an approximately trapezoidal shape, a circumferential width gradually becomes narrower toward a tip end, and a radial thickness gradually becomes thinner toward the tip end, and are arranged on the outer circumferential portions of the first yoke portion 19 at a uniform angular pitch circumferentially. In addition, first trough portions 26 are recessed so as to have U shapes that curve concavely toward a radially-inner side, for example, at portions that are positioned between respective adjacent first claw-shaped magnetic pole portions 20 of the first yoke portion 19.

The second pole core body 21 has: a second boss portion 22 that has an outer circumferential surface that has a cylindrical shape, and in which a shaft insertion aperture is formed so as to pass through a central axial position; a thick ring-shaped second yoke portion 23 that is disposed so as to extend radially outward from a second end edge portion of the second boss portion 22; and second claw-shaped magnetic pole portions 24 that are disposed so as to extend toward a first axial end from outer circumferential portions of the second yoke portion 23. Eight, for example, second claw-shaped magnetic pole portions 24 are formed so as to have a tapered shape in which a radially-outermost surface shape is an approximately trapezoidal shape, a circumferential width gradually becomes narrower toward a tip end, and a radial thickness gradually becomes thinner toward the tip end, and are arranged on the outer circumferential portions of the second yoke portion 23 at a uniform angular pitch circumferentially. In addition, second trough portions 27 are recessed so as to have U shapes that curve concavely toward a radially-inner side, for example, at portions that are positioned between respective adjacent second claw-shaped magnetic pole portions 24 of the second yoke portion 23.

A first magnet holder 30 is prepared into a columnar body that has a rectangular cross section that has a predetermined thickness using a magnetic material such as iron, or a ferromagnetic alloy, etc. A first interfitting groove 31 that has a groove direction in a thickness direction of the first magnet holder 30 is recessed over the entire thickness direction of the first magnet holder 30 so as to have an opening on an upper surface of the first magnet holder 30. Here, upper and lower surfaces of the first magnet holder 30 and a bottom surface of the first interfitting groove 31 are mutually parallel flat surfaces. The first interfitting groove 31 is formed so as to have a wedge shape in which a groove width becomes gradually narrower toward the opening.

A first permanent magnet 32 is prepared into a columnar body in which a cross section in a plane that is perpendicular to the thickness direction has an external shape that is slightly smaller than an internal shape of the first interfitting groove 31, and the external shape is trapezoidal. The first permanent magnet 32 is prepared so as to have a thickness that is thinner than the first magnet holder 30, and upper and lower surfaces thereof are mutually parallel flat surfaces.

A second magnet holder 35 is prepared into a columnar body that has a rectangular cross section that has a predetermined thickness using a magnetic material such as iron, or a ferromagnetic alloy, etc. A second interfitting groove 36 that has a groove direction in a thickness direction of the second magnet holder 35 is recessed over the entire thickness direction of the second magnet holder 35 so as to have an opening on an upper surface of the second magnet holder 35. Here, upper and lower surfaces of the second magnet holder 35 and a bottom surface of the second interfitting groove 36 are mutually parallel flat surfaces. The second interfitting groove 36 is formed so as to have a wedge shape in which a groove width becomes gradually narrower toward the opening.

A second permanent magnet 37 is prepared into a columnar body in which a cross section in a plane that is perpendicular to the thickness direction has an external shape that is slightly smaller than an internal shape of the second interfitting groove 36, and the external shape is trapezoidal. The second permanent magnet 37 is prepared so as to have a thickness that is thinner than the second magnet holder 35, and upper and lower surfaces thereof are mutually parallel flat surfaces.

First holding grooves 28 are recessed from a first end toward a second end of the first yoke portion 19 near roots of respective first claw-shaped magnetic pole portions 20 of the first pole core body 17 so as to have openings at respective portions that face toward upper portions of inner wall surfaces of the respective first trough portions 26 and so as to have groove directions in an axial direction. Similarly, second holding grooves 29 are recessed from a second end toward a first end of the second yoke portion 23 near roots of respective second claw-shaped magnetic pole portions 24 of the second pole core body 21 so as to have openings at respective portions that face toward upper portions of inner wall surfaces of the respective second trough portions 27 and so as to have groove directions in an axial direction. Here, the first and second holding grooves 28 and 29 are formed by broaching, or end milling, etc., so as to have groove shapes into which the first and second side portions of the first and second magnet holders 30 and 35 can be fitted.

The first and second fans 40A and 40B are prepared by cutting and bending metal plates made of iron, a ferromagnetic alloy, etc., and include: a flat, ring-shaped base portion 41; nine, for example, blades 42 that are each cut and raised from the base portion 41 to a first surface side of the base portion 41 so as to be arranged in a row circumferentially; and eight thermally conductive plates 43 that are each cut and raised from the base portion 41 to a second surface side of the base portion 41 so as to be arranged at a uniform angular pitch circumferentially. Here, the thermally conductive plates 43 have flat, rectangular shapes, and project from the second surface of the base portion 41 so as to contact a cylindrical surface that has a center of the base portion 41 as an axis. In addition, end plates 44 are prepared by cutting metal plates into ring shapes, and are welded to each of the blades 42 so as to face the base portion 41 are mounted to the first and second fans 40A and 40B so as to link the blades 42.

A bobbin 25 is made of a resin, and includes: a tubular drum portion 25a; and a pair of flange portions 25b that are disposed so as to extend radially outward from two axial end portions of the drum portion 25a. The field coil 14 is prepared by winding a conducting wire onto the drum portion 25a for a predetermined number of turns.

To assemble a rotor 13 that is configured in this manner, first magnet holders 30 are first mounted to the first pole core body 17 so as to span over the respective first trough portions 26 and be connected magnetically by being press-fitted into the facing first holding grooves 28 from axially outside such that upper surfaces face radially outward, and such that the groove directions of the first interfitting grooves 31 are oriented axially, adhesive being applied if required. First permanent magnets 32 are then mounted into each of the first magnet holders 30 by being fitted into the first interfitting grooves 31 from axially outside. Next, the first fan 40A is mounted by the base portion 41 thereof being resistance-welded to a first axial end surface of the first pole core body 17. At this time, the thermally conductive plates 43 of the first fan 40A are press-fitted between the lower surfaces of the first permanent magnets 32 and the bottom surfaces of the first interfitting grooves 31 from axially outside such that the first permanent magnets 32 are held in a fixed state by the first magnet holders 30.

Second magnet holders 35 are mounted to the second pole core body 21 so as to span over the respective second trough portions 27 and be connected magnetically by being press-fitted into the facing second holding grooves 29 from axially outside such that upper surfaces face radially outward, and such that the groove directions of the second interfitting grooves 36 are oriented axially, adhesive being applied if required. Second permanent magnets 37 are then mounted into each of the second magnet holders 35 by being fitted into the second interfitting grooves 36 from axially outside. Next, the second fan 40B is mounted by the base portion 41 thereof being resistance-welded to a second axial end surface of the second pole core body 21. At this time, the thermally conductive plates 43 of the second fan 40B are press-fitted between the lower surfaces of the second permanent magnets 37 and the bottom surfaces of the second interfitting grooves 36 from axially outside such that the second permanent magnets 37 are held in a fixed state by the second magnet holders 35.

Next, the first and second claw-shaped magnetic pole portions 20 and 24 of the first and second pole core bodies 17 and 21 are alternately intermeshed and a second end surface of the first boss portion 18 is abutted to a first end surface of the second boss portion 22. At this time, the drum portion 25a of the bobbin 25 onto which the field coil 14 has been wound is mounted so as to be fitted over the first and second boss portions 18 and 22, and the first and second flange portions 25*b* are placed in close contact with the inner wall surface of the first and second yoke portions 19 and 23. The field coil 14 is thereby wound onto the bobbin 25, and is mounted in a space that is surrounded by the first and second boss portions 18 and 22, the first and second yoke portions 19 and 23, and the first and second claw-shaped magnetic pole portions 20 and 24. The first and second pole core bodies 17 and 21 are then integrated by inserting the shaft 16 into the shaft insertion apertures of the first and second boss portions 18 and 22 in a press-fitted state such that the rotor 13 is assembled.

Here, the first and second boss portions 18 and 22 and the first and second yoke portions 19 and 23 correspond to a boss portion and a pair of yoke portions of the pole core 15. Tip end portions of the first and second claw-shaped magnetic pole portions 20 and 24 overlap with the second and first yoke portions 23 and 19 in an axial direction.

The first and second permanent magnets 32 and 37 are magnetically oriented such that major components of directions of magnetization 50 are in a radial direction. As shown in FIG. 1, the directions of magnetization 50 are in reverse directions to the orientation of a magnetic field 51 that is generated by passing an electric current through the field coil 14. Here, the first and second permanent magnets 32 and 37 are disposed such that the upper surfaces thereof face inner circumferential surfaces near the tip ends of the second and first claw-shaped magnetic pole portions 24 and 20 so as to have a predetermined clearance. Extensions of the directions of magnetization 50 of the first and second permanent magnets 32 and 37 are directed at inner circumferential surfaces near the tip ends of the facing second and first claw-shaped magnetic pole portions 24 and 20. Moreover, in the case of a design in which the orientation of the magnetic field 51 that the field current that flows through the field coil 14 produces is inverted, the first and second permanent magnets 32 and 37 will also be magnetically oriented in a reverse direction.

Next, operation of an automotive alternator 1 that has been configured in this manner will be explained.

First, current is supplied from a battery (not shown) to the field coil 14 of the rotor 13 by means of the brushes 9 and the slip rings 8, generating magnetic flux. The first claw-shaped magnetic pole portions 20 of the first pole core body 17 are magnetized into North-seeking (N) poles by this magnetic flux, and the second claw-shaped magnetic pole portions 24 of the second pole core body 21 are magnetized into South-seeking (S) poles.

At the same time, rotational torque from an engine is transmitted to the shaft 16 by means of a belt (not shown) and the pulley 6, rotating the rotor 13. Thus, a rotating magnetic field is applied to the stator coil 12 of the stator 10, generating electromotive forces in the stator coil 12. These alternating-current electromotive forces are rectified into direct current by the rectifier to charge the battery or to be supplied to electric loads, etc.

The first and second fans 40A and 40B are driven to rotate together with the rotation of the rotor 13. Cooling airflows are thereby formed that are sucked in through axial end surfaces of the front bracket 2 and the rear bracket 3, are deflected centrifugally by the first and second fans 40A and 40B, and are discharged through radial side surfaces. Heat-generating parts such as the rectifier, the voltage regulator, the stator coil 12, etc., are cooled by these cooling airflows. Heat that has been generated in the first and second permanent magnets 32 and 37 is transferred to the base portion 41 and the blades 42 by means of the thermally conductive plates 43, and is radiated to the cooling airflows. The cooling airflows flow smoothly radially outward through the ventilation channels that are configured by the base portions 41 and the end plates 44 over the surfaces of the blades 42, suppressing occurrences of interference noise that result from the rotation of the first and second fans 40A and 40B.

Next, operation of magnetic flux from the field coil 14 will be explained.

Magnetic flux that has been generated when the current is passed through the field coil 14 enters tooth portions of the stator core 11 by passing through the air gap 39 from the first claw-shaped magnetic pole portions 20. The magnetic flux then moves circumferentially through a core back portion from the tooth portions of the stator core 11, and enters neighboring second claw-shaped magnetic pole portions 24 by passing through the air gap 39 from the tooth portions that face those second claw-shaped magnetic pole portions 24. Next, the magnetic flux that has entered the second claw-shaped magnetic pole portions 24 passes through the second yoke portion 23, the second boss portion 22, the first boss portion 18, and the first yoke portion 19, and reaches the first claw-shaped magnetic pole portions 20. Now, in a conventional Lundell rotor, because the first and second pole core bodies are at their design limit, they are magnetically saturated by the magnetic field that is generated by the field coil, reducing magnetic flux that is generated by the rotor.

To interlink with the stator core 11, it is necessary for the magnetic flux that originates from the first and second permanent magnets 32 and 37 to make a round trip across the air gap 39, which has a large magnetic resistance. Because the first and second permanent magnets 32 and 37 are disposed radially inside the second and first claw-shaped magnetic pole portions 24 and 20, the magnetic flux that originates from the first and second permanent magnets 32 and 37 circuits in a shorter magnetic path length than the inner circumferential surface sides of the first and second claw-shaped magnetic pole portions 20 and 24. Thus, a large portion of the magnetic flux that originates from the first and second permanent magnets 32 and 37 forms a closed magnetic circuit inside the rotor without going around through the stator core 13.

Specifically, the magnetic flux that originates from the first permanent magnets 32 enters the first magnet holders 30 through the thermally conductive plates 43, flows through the first magnet holders 30 circumferentially, and enters the first yoke portion 19. The magnetic flux that has entered the first yoke portion 19 flows through the first yoke portion 19 radially inward along the first trough portions 26, and also passes through the first boss portion 18, the second boss portion 22, the second yoke portion 23, and the second claw-shaped magnetic pole portions 24, and returns to the first permanent magnets 32 across a gap. The magnetic flux that originates from the second permanent magnets 37, on the other hand, enters the first claw-shaped magnetic pole portions 20 across a gap, passes through the first yoke portion 19, the first boss portion 18, and the second boss portion 22, and enters the second yoke portion 23. The magnetic flux that has entered the second yoke portion 23 flows radially outward along the second trough portions 27 of the second yoke portion 23, and enters the second magnet holders 35 from two circumferential sides of the second magnet holders 35. The magnetic flux that has entered the second magnet holders 35 passes through the thermally conductive plates 43 and returns to the second permanent magnets 32.

Since the magnetic flux that originates from the first and second permanent magnets 32 and 37 is in a reverse direction from the magnetic flux that originates from the field coil 14, significantly reducing the magnetic flux density of the magnetic bodies that constitute the first and second pole core bodies 17 and 21, magnetic saturation can be relieved. As a result, the amount of power generated in a low-speed rotation range, where magnetic saturation is particularly pronounced, is increased by an order of several tens of percent in the automotive alternator 1. Alternatively, if the number of turns in the stator coil 12 is reduced by an order of several tens of percent, as a design alternative, a similar amount of power to that generated by conventional devices can be ensured in the low-speed rotation range, and the amount of power generated in a high-speed rotation region can be increased further than conventional devices.

According to Embodiment 1, first and second magnet holders 30 and 35 are held by first and second yoke portions 19 and 21, first and second permanent magnets 32 and 37 are fitted into first and second interfitting grooves 31 and 36 that have wedge-shaped groove shapes, and thermally conductive plates 43 are press-fitted between lower surfaces of the first and second permanent magnets 32 and 37 and bottom surfaces of the first and second interfitting grooves 31 and 36. Thus, because the first and second permanent magnets 32 and 37 can be held in the first and second magnet holders 30 and 35 without wobbling, it is not necessary to fix the first and second permanent magnets 32 and 37 to the first and second magnet holders 30 and 35 using an adhesive, making a step of applying the adhesive and a step of hardening the adhesive unnecessary. Radial and circumferential movement of the first and second permanent magnets 32 and 37 is also restricted by the wedge-shaped groove shapes of the first and second interfitting grooves 31 and 36, and axial movement of the first and second permanent magnets 32 and 37 is restricted by the press-fitting of the thermally conductive plates 43.

Because centrifugal forces that act on the first and second permanent magnets 32 and 37 are borne by the first and second magnet holders 30 and 35, and centrifugal forces that act on the first and second magnet holders 30 and 35 are borne by the first and second yoke portions 19 and 21, the centrifugal forces that act on the first and second permanent magnets 32 and 37 and the first and second magnet holders 30 and 35 do not act on the first and second fans 40A and 40B through the thermally conductive plates 43. Thus, occurrences of damage to the first and second fans 40A and 40B can be suppressed without increasing the rigidity of the first and second fans 40A and 40B inordinately. Moreover, increasing the rigidity of the first and second fans 40A and 40B inordinately would increase the plate thickness of the first and second fans 40A and 40B, giving rise to a steep rise in material costs, and centrifugal forces that act directly on the first and second fans 40A and 40B would also increase, leading to damage occurring.

Because the thermally conductive plates 43 are prepared using a metal plate made of iron, a ferromagnetic alloy, etc., heat that has been generated in the first and second permanent magnets 32 and 37 is transferred to the base portion 41 and the blades 42 by means of the thermally conductive plates 43, and is radiated to the cooling airflows. Thus, thermal demagnetization of the first and second permanent magnets 32 and 37 is suppressed. The base portion 41, the blades 42, and the thermally conductive plates 43 can be formed easily and inexpensively by cutting and bending the metal plate.

Because the thermally conductive plates 43 are prepared using a magnetic material such as iron, a ferromagnetic alloy, etc., increases in magnetoresistance between the first and second permanent magnets 32 and 37 and the first and second magnet holders 30 and 35, which constitute magnetic circuits, can be suppressed. Thus, magnetic flux that is generated by the first and second permanent magnets 32 and 37 can be used effectively.

Embodiment 2

Figure 6:
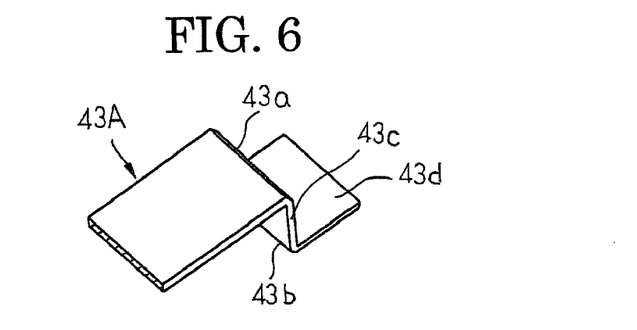
FIG. 6 is a perspective that shows a thermally conductive plate on a fan that can be used in an automotive alternator according to Embodiment 2 of the present invention.
Figure 7:
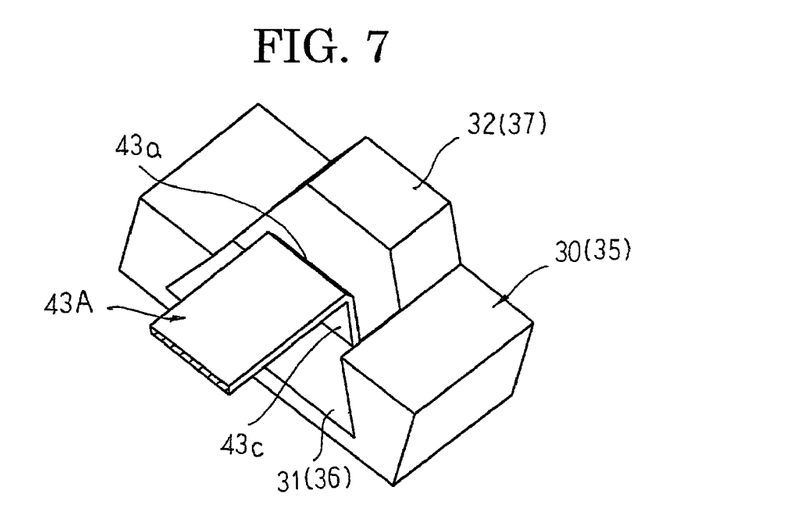
FIG. 7 is a perspective that shows a mounted state of a permanent magnet in a rotor that can be used in the automotive alternator according to Embodiment 2 of the present invention.

FIG. 6 is a perspective that shows a thermally conductive plate on a fan that can be used in an automotive alternator according to Embodiment 2 of the present invention, and FIG. 7 is a perspective that shows a mounted state of a permanent magnet in a rotor that can be used in the automotive alternator according to Embodiment 2 of the present invention.

In FIGS. 6 and 7, thermally conductive plates 43A extend axially inward from a base portion, are bent at ninety degrees at a first bent portion 43a and extend radially inward, and are also bent at ninety degrees at a second bent portion 43b and extend axially inward. Leading end portions 43d of the thermally conductive plates 43A are press-fitted between bottom surfaces of first and second permanent magnets 32 and 37 and lower surfaces of first and second interfitting grooves 31 and 36. Surfaces of intermediate portions 43c between the first bent portion 43a and the second bent portion 43b that face axially inward come into contact with end surfaces of the first and second permanent magnets 32 and 37 that face axially outward.

Moreover, the rest of the configuration is configured in a similar manner to Embodiment 1 above.

In Embodiment 2, because leading end portions 43d of thermally conductive plates 43A are press-fitted between bottom surfaces of first and second permanent magnets 32 and 37 and lower surfaces of first and second interfitting grooves 31 and 36, first and second permanent magnets 32 and 37 can be held in first and second magnet holders 30 and 35 without wobbling. Consequently, effects can also be achieved in Embodiment 2 in a similar manner to Embodiment 1 above.

According to Embodiment 2, because surfaces of intermediate portions 43c of the thermally conductive plates 43A that face axially inward come into contact with end surfaces of the first and second permanent magnets 32 and 37 that face axially outward, heat that is generated in the first and second permanent magnets 32 and 37 is transferred to the base portions not only through the leading end portions 43d but also through the intermediate portions 43c. Thus, heat that is generated in the first and second permanent magnets 32 and 37 can be radiated efficiently, enabling temperature increases in the first and second permanent magnets 32 and 37 to be suppressed further.

Embodiment 3

Figure 8:
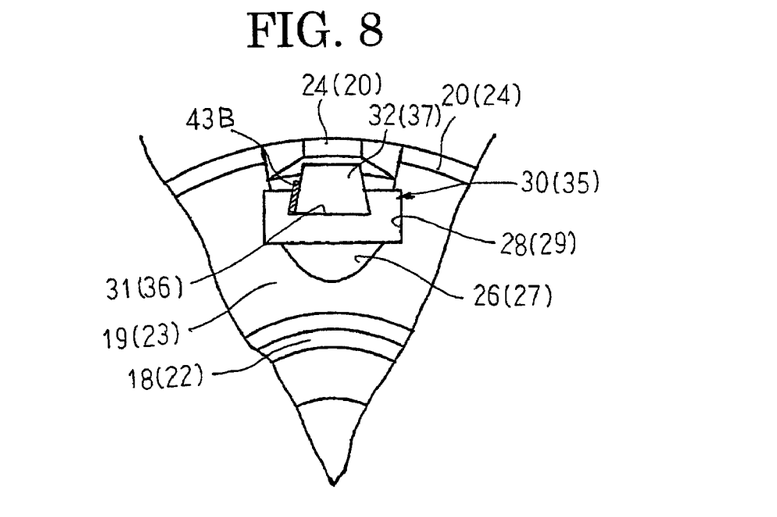
FIG. 8 is a partial end elevation that explains a permanent magnet holding construction in a rotor that can be used in an automotive alternator according to Embodiment 3 of the present invention.
Figure 9:
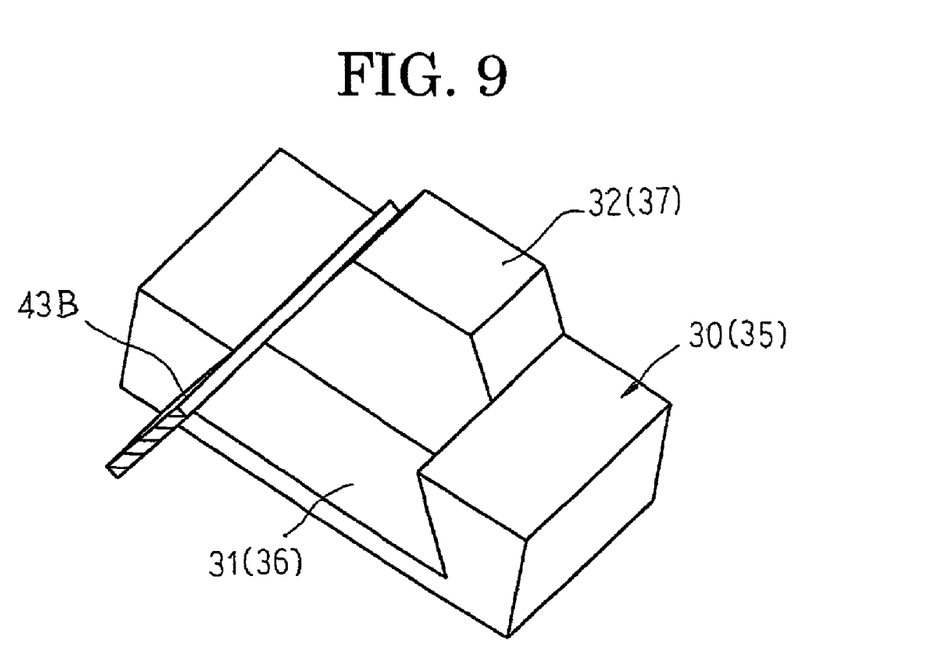
FIG. 9 is a perspective that shows a mounted state of a permanent magnet in the rotor that can be used in the automotive alternator according to Embodiment 3 of the present invention.

FIG. 8 is a partial end elevation that explains a permanent magnet holding construction in a rotor that can be used in an automotive alternator according to Embodiment 3 of the present invention, and FIG. 9 is a perspective that shows a mounted state of a permanent magnet in the rotor that can be used in the automotive alternator according to Embodiment 3 of the present invention. Moreover, a cooling fan has been omitted from FIG. 8.

Although not shown, in Embodiment 3, first and second fans are prepared by cutting and bending metal plates that are made of a nonmagnetic metal material such as copper, aluminum, a stainless alloy, etc. Eight thermally conductive plates 43B are cut and raised from a base portion to a second surface side of the base portion so as to be arranged at a uniform angular pitch circumferentially. The respective thermally conductive plates 43B are inclined at a predetermined angle relative to a radial direction of the base portion so as to engage with inner wall surfaces of wedge-shaped first and second interfitting grooves 31 and 36 of first and second magnet holders 30 and 35 when the first and second fans are mounted to end surfaces of first and second pole core bodies. As shown in FIGS. 8 and 9, leading end portions of the thermally conductive plates 43B are press-fitted between inclined surfaces of trapezoidal cross sections of first and second permanent magnets 32 and 37 and inner wall surfaces of first and second interfitting grooves 31 and 36.

Moreover, the rest of the configuration is configured in a similar manner to Embodiment 1 above.

In Embodiment 3, because leading end portions of the thermally conductive plates 43B are press-fitted between inclined surfaces of trapezoidal cross sections of first and second permanent magnets 32 and 37 and inner wall surfaces of first and second interfitting grooves 31 and 36, the first and second permanent magnets 32 and 37 can be held in first and second magnet holders 30 and 35 without wobbling. Consequently, similar effects to those in Embodiment 1 above can also be achieved in Embodiment 3.

Now, if thermally conductive plates that are interposed between the inclined surfaces of the permanent magnets and the inner wall surfaces of the interfitting grooves are made of a magnetic material, "leakage flux", in which magnetic flux that has originated in the permanent magnets flows through the thermally conductive plate to the magnet holder is generated, reducing the amount of magnetic flux that flows to pole core bodies. According to Embodiment 3, because the thermally conductive plates 43B are prepared using a nonmagnetic material, the occurrence of leakage flux is suppressed, enabling the magnetic flux of the first and second permanent magnets 32 and 37 to be used effectively.

Embodiment 4

Figure 10:
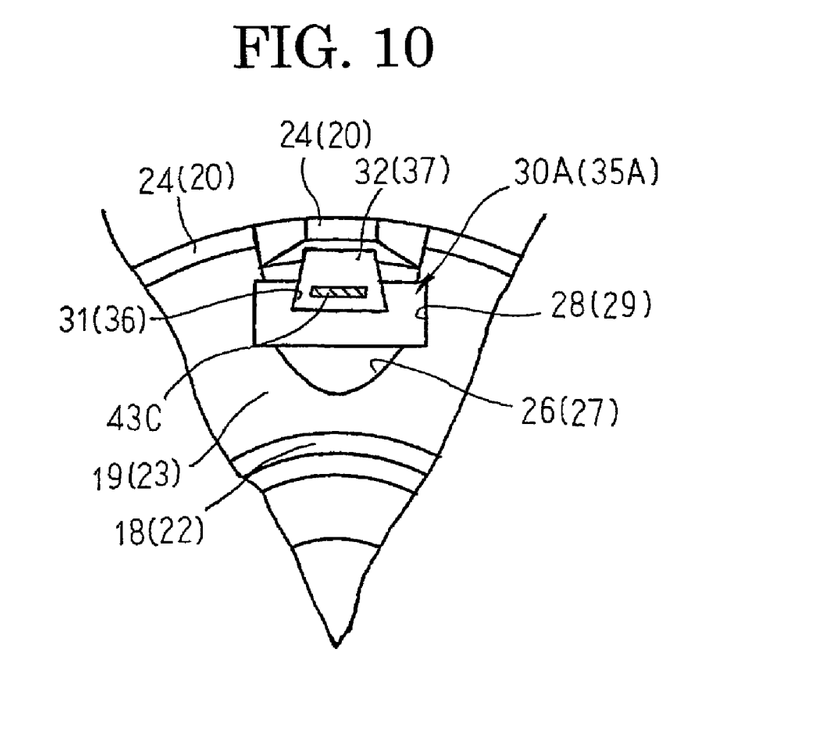
FIG. 10 is a partial end elevation that explains a permanent magnet holding construction in a rotor that can be used in an automotive alternator according to Embodiment 4 of the present invention.
Figure 11:
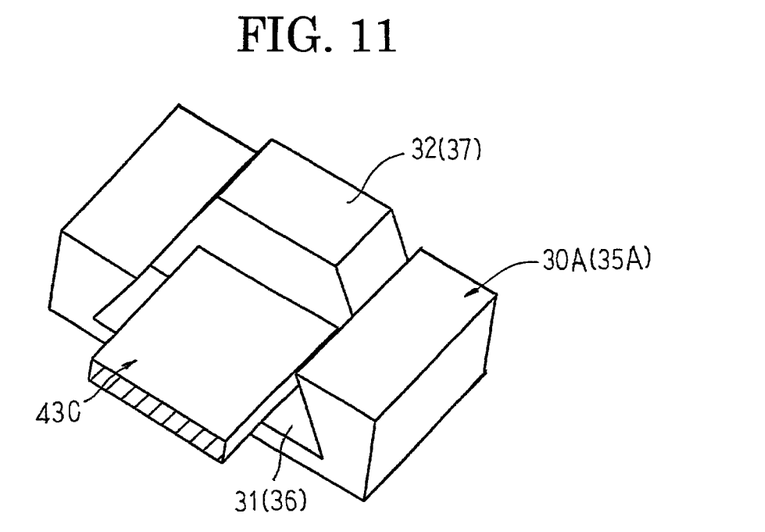
FIG. 11 is a perspective that shows a mounted state of a permanent magnet in the rotor that can be used in the automotive alternator according to Embodiment 4 of the present invention.
Figure 12:
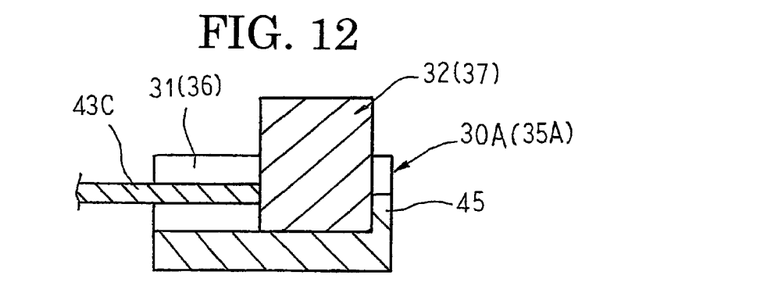
FIG. 12 is a cross section that shows the mounted state of the permanent magnet in the rotor that can be used in the automotive alternator according to Embodiment 4 of the present invention.

FIG. 10 is a partial end elevation that explains a permanent magnet holding construction in a rotor that can be used in an automotive alternator according to Embodiment 4 of the present invention, FIG. 11 is a perspective that shows a mounted state of a permanent magnet in the rotor that can be used in the automotive alternator according to Embodiment 4 of the present invention, and FIG. 12 is a cross section that shows the mounted state of the permanent magnet in the rotor that can be used in the automotive alternator according to Embodiment 4 of the present invention. Moreover, a cooling fan has been omitted from FIG. 10.

In FIGS. 10 through 12, stopping portions 45 are disposed so as to project from first end portions in groove directions on bottom surfaces of first and second interfitting grooves 31 and 36 of first and second magnet holders 30A and 35A. The first and second magnet holders 30A and 35A are fitted into first and second holding grooves 28 and 29 such that the stopping portions 45 face toward first and second boss portions 18 and 22, and are held by first and second pole core bodies 17 and 21, adhesive being applied if required. In addition, first and second permanent magnets 32 and 37 are fitted into the first and second interfitting grooves 31 and 36 so as to come into contact with the stopping portions 45. The lengths of projection of the thermally conductive plates 43C from base portions of the first and second fans are shorter than those of the thermally conductive plates 43 according to Embodiment 1. Thus, when the first and second fans are mounted by resistance welding the base portions to end surfaces of the first and second pole core bodies 17 and 21, leading end surfaces of the respective thermally conductive plates 43C come into contact with end surfaces of the first and second permanent magnets 32 and 37 that face axially outward.

Moreover, the rest of the configuration is configured in a similar manner to Embodiment 1 above.

In Embodiment 4, first and second permanent magnets 32 and 37 are fitted into first and second interfitting grooves 31 and 36 that have wedge-shaped groove shapes, restricting circumferential and radial motion of the first and second permanent magnets 32 and 37. The thermally conductive plates 43C press the first and second permanent magnets 32 and 37 axially inward when the base portions of the first and second fans are fixed to the end surfaces of the first and second pole core bodies 17 and 21. The first and second permanent magnets 32 and 37 are thereby held between the thermally conductive plates 43C and the stopping portions 45, restricting axial movement.

Consequently, similar effects to those in Embodiment 1 above can also be achieved in Embodiment 4.

Embodiment 5

Figure 13:
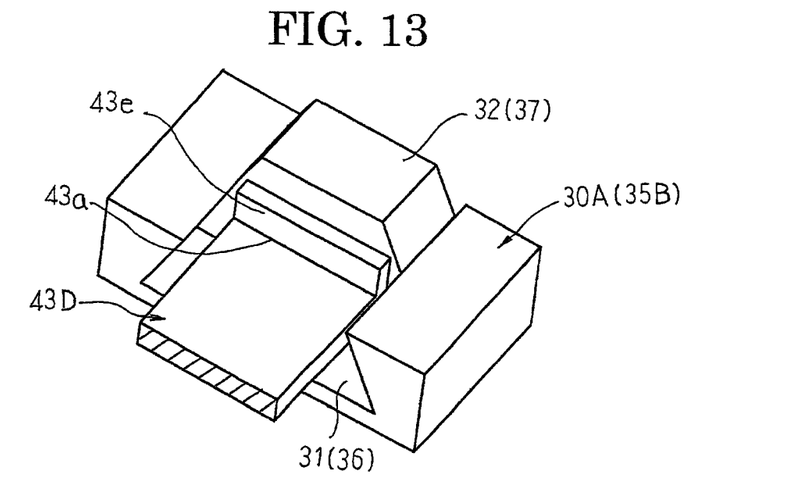
FIG. 13 is a perspective that shows a mounted state of a permanent magnet in a rotor that can be used in an automotive alternator according to Embodiment 5 of the present invention.

FIG. 13 is a perspective that shows a mounted state of a permanent magnet in a rotor that can be used in an automotive alternator according to Embodiment 5 of the present invention.

In FIG. 13, thermally conductive plates 43D extend axially inward from base portions, are bent at ninety degrees at a first bent portion 43a, and extend radially outward. Surfaces of leading end portions 43c of the thermally conductive plates 43D that face axially inward come into contact with end surfaces of the first and second permanent magnets 32 and 37 that face axially outward.

Moreover, the rest of the configuration is configured in a similar manner to Embodiment 4 above.

Consequently, similar effects to those in Embodiment 4 above can also be achieved in Embodiment 5.

According to Embodiment 5, because surfaces of leading end portions 43c of thermally conductive plates 43D that face axially inward come into contact with end surfaces of the first and second permanent magnets 32 and 37, contact area between the thermally conductive plates 43D and the first and second permanent magnets 32 and 37 is increased. Thus, heat that is generated in the first and second permanent magnets 32 and 37 is easily transferred to the base portions of the first and second fans and the blades, enabling the first and second permanent magnets 32 and 37 to be cooled effectively.

Embodiment 6

Figure 14:
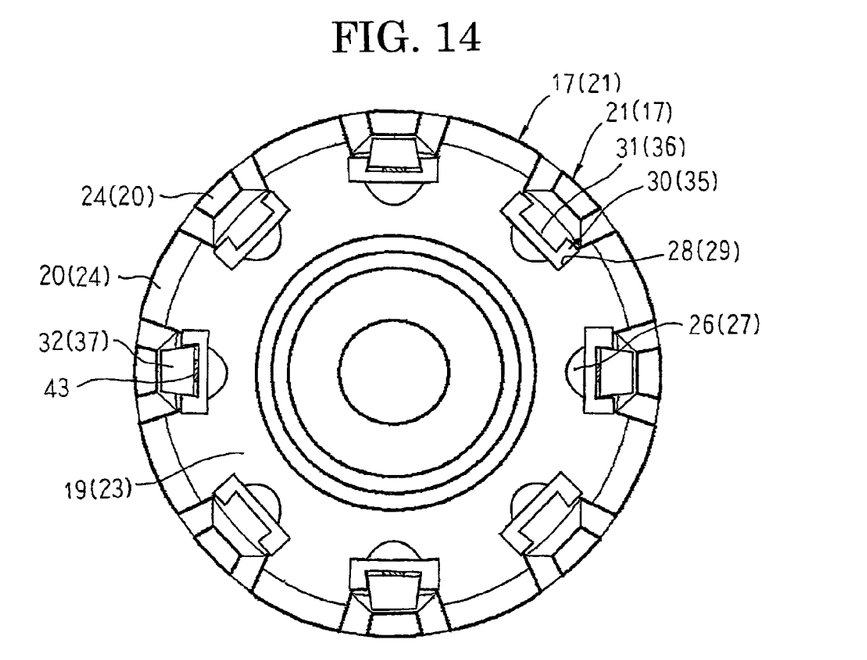
FIG. 14 is an end elevation that explains a permanent magnet holding construction in a rotor that can be used in an automotive alternator according to Embodiment 6 of the present invention.

FIG. 14 is an end elevation that explains a permanent magnet holding construction in a rotor that can be used in an automotive alternator according to Embodiment 6 of the present invention. Moreover, a cooling fan has been omitted from FIG. 14.

In FIG. 14, first magnet holders 30 are disposed so as to span over all of first trough portions 26, first permanent magnets 32 are held in circumferentially alternate first magnet holders 30, and thermally conductive plates 43 are press-fitted between lower surfaces of the first permanent magnets 32 and bottom surfaces of first interfitting grooves 31. Second magnet holders 35 are disposed so as to span over all of second trough portions 27, second permanent magnets 37 are held in circumferentially alternate second magnet holders 35, and thermally conductive plates 43 are press-fitted between lower surfaces of the second permanent magnets 37 and bottom surfaces of second interfitting grooves 36.

Moreover, the rest of the configuration is configured in a similar manner to Embodiment 1 above.

In Embodiment 6, because first and second magnet holders 30 and 35 are disposed at a uniform angular pitch circumferentially, and first and second permanent magnets 32 and 37 are disposed at a uniform angular pitch circumferentially, breakdown of magnetic balance and mechanical balance that results from disposal of the first and second permanent magnets 32 and 37 is suppressed.

Because the first and second permanent magnets 32 and 37 are held in circumferentially alternate first and second magnet holders 30 and 35, automotive alternator output is reduced by an amount proportionate to the number of permanent magnets that are reduced.

Thus, automotive alternator output changes depending on the number of first and second permanent magnets 32 and 37 disposed. By adopting this configuration, automotive alternator output can be adjusted by changing the number of permanent magnets disposed, and cost reductions that accompany reductions in the number of permanent magnets can be achieved. In other words, the number of permanent magnets disposed may also be arbitrarily selected to match output values that will be demanded of an automotive alternator. Here, it is preferable that consideration be given to magnetic balance and mechanical balance when disposing the permanent magnets.

Moreover, in Embodiment 6 above, four first and four second permanent magnets 32 and 37 are disposed in the respective first and second pole core bodies 17 and 21, but eight first permanent magnets 32 may also be disposed in the first pole core body 17, and no permanent magnets disposed in the second pole core body 21, for example. In that case, if the amount of ventilation from the first fan 40A is sufficient, the second fan 40B that is fixed to the second pole core body 21 may also be omitted.

Embodiment 7

Figure 15:
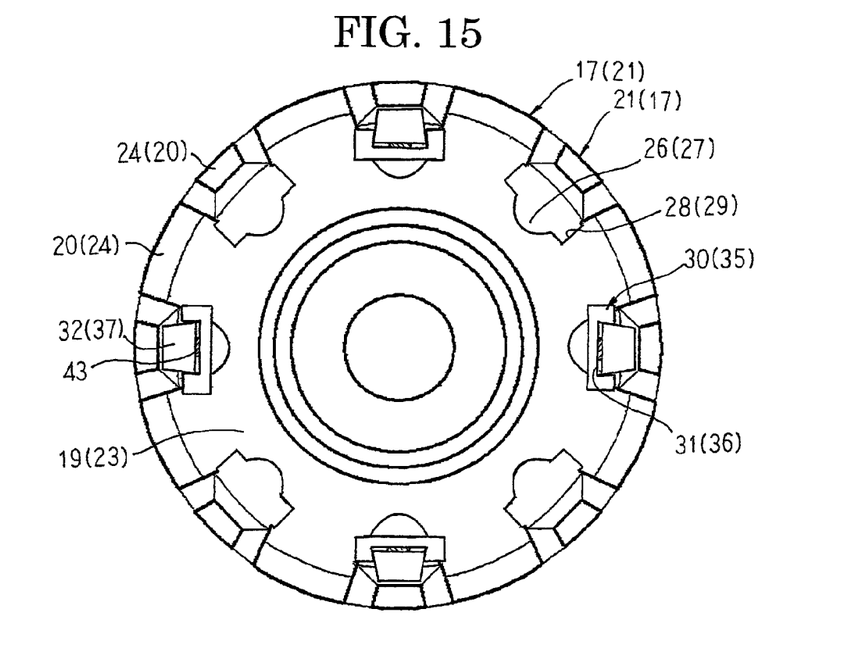
FIG. 15 is an end elevation that explains a permanent magnet holding construction in a rotor that can be used in an automotive alternator according to Embodiment 7 of the present invention.

FIG. 15 is an end elevation that explains a permanent magnet holding construction in a rotor that can be used in an automotive alternator according to Embodiment 7 of the present invention. Moreover, a cooling fan has been omitted from FIG. 15.

In FIG. 15, first magnet holders 30 are disposed so as to span over circumferentially alternate first trough portions 26, first permanent magnets 32 are held in all of the first magnet holders 30, and thermally conductive plates 43 are press-fitted between lower surfaces of the first permanent magnets 32 and bottom surfaces of first interfitting grooves 31. Here, second magnet holders 35, second permanent magnets 37, and thermally conductive plates 43 are also disposed in a similar manner in a second pole core body 21. Moreover, the rest of the configuration is configured in a similar manner to Embodiment 6 above.

Consequently, similar effects to those in Embodiment 6 above can also be achieved in Embodiment 7.

Moreover, in each of the above embodiments, explanations are given for automotive alternators, but the present invention is not limited to automotive alternators, and similar effects are also exhibited if the present invention is applied to dynamoelectric machines such as automotive electric motors, automotive generator-motors, etc.

In each of the above embodiments, magnet holders are held in yoke portions by being fitted into holding grooves that are formed near upper portions of inner wall surfaces of trough portions, adhesive being applied if required, but the magnet holders are not limited to this holding method, and magnet holders may also be fixed near upper portions of inner wall surfaces of trough portions, for example, by welding, etc.

In each of the above embodiments, lower end portions of permanent magnets fit into interfitting grooves that are formed on upper surfaces of magnet holders, but the two interfitting constructions are not limited to interfitting constructions in which protruding portions and recess portions have trapezoidal cross sections, provided that permanent magnets are held in magnet holders such that at least radial and circumferential movement is restricted. Cross-sectional shapes of the permanent magnets are also not limited to trapezoidal shapes, and can be appropriately set to match groove shapes of interfitting grooves.

In each of the above embodiments, fans are mounted by fixing base portions to two axial end surfaces of a pole core by resistance welding, but the method for fixing the base portions to the pole core is not limited to resistance welding, and fans may also be fixed by crimping, for example.

In each of the above embodiments, fans that are constituted by a base portion, blades, and thermally conductive plates are prepared by cutting and bending a single metal plate, but fans may also be prepared by integrating by welding, fixing adhesively, etc., a base portion, blades and thermally conductive plates that have been prepared as separate parts.

In each of the above embodiments, a material for the first and second permanent magnets has not been explained, but it is preferable to use sintered rare-earth magnets such as neodymium-iron-boron magnets, samarium-cobalt magnets, etc., that have a high magnetic flux density.

In each of the above embodiments, first and second pole core bodies in which first and second trough portions are formed on first and second yoke portions are used, but first and second pole core bodies in which first and second trough portions are not formed on first and second yoke portions may also be used. In that case, first and second magnet holders may also be held directly on outer circumferential surfaces of the first and second yoke portions so as to face inner circumferential surfaces near tip ends of second and first claw-shaped magnetic pole portions.

What is claimed is:

1. A dynamoelectric machine comprising:
   a rotor comprising:
      a pole core comprising:
         a boss portion;
         a pair of yoke portions that are disposed so as to extend radially outward from two axial end edge portions of said boss portion; and
         a plurality of claw-shaped magnetic pole portions that are disposed so as to extend in an axial direction alternately from each of said pair of yoke portions, and that are arranged circumferentially so as to intermesh with each other,
         said pole core being fixed to a shaft that is inserted through a central axial position of said boss portion;
      a resin bobbin comprising:
         a drum portion that is mounted so as to be fitted over said boss portion; and
         a pair of flange portions that extend radially outward from two axial end portions of said drum portion parallel to inner wall surfaces of said pair of yoke portions; and
      a field coil that is wound onto said bobbin, and that is housed inside a space that is surrounded by said boss portion, said pair of yoke portions, and said plurality of claw-shaped magnetic pole portions;
   a stator that is disposed so as to surround an outer circumference of said rotor so as to have a predetermined air gap interposed; and
   a metal fan comprising:
      a base portion that is fixed to at least one axial end surface of said pole core; and
      a blade that is disposed so as to stand on said base portion,
   wherein:
      a magnet holder that is made of a magnetic material that is held by a yoke portion so as to face an inner circumferential surface near a tip end of said claw-shaped magnetic pole portions, and said magnet holder defining therein an interfitting groove that has a groove direction in an axial direction is formed so as to open at least radially outward and axially outward, and so as to lead inward from an axially outer side;
      a permanent magnet that is held by said magnet holder by being fitted into said interfitting groove, that is disposed so as to face an inner circumferential surface near a tip end of said claw-shaped magnetic pole portions so as to have a predetermined clearance, and that is magnetically oriented in a reverse direction to a direction of a magnetic field that said field coil produces; and a metal thermally conductive plate that is disposed so as to extend axially inward from said base portion, and that has a projecting end portion that is placed in close contact with said permanent magnet.

2. A dynamoelectric machine according to claim 1, wherein said projecting end portion of said thermally conductive plate is press-fitted between said interfitting groove and said permanent magnet.

3. A dynamoelectric machine according to claim 2, wherein said thermally conductive plate is prepared using a magnetic material, and said projecting end portion is press-fitted into a radial gap between said interfitting groove and said permanent magnet.

4. A dynamoelectric machine according to claim 2, wherein said thermally conductive plate is prepared using a nonmagnetic material, and said projecting end portion is press-fitted into a circumferential gap between said interfitting groove and said permanent magnet.

5. A dynamoelectric machine according to claim 1, wherein said projecting end portion of said thermally conductive plate comes into contact with an axially outer end surface of said permanent magnet.

6. A dynamoelectric machine according to claim 1, wherein said base portion, said blade, and said thermally conductive plate are prepared from a single metal plate.

* * * * *